Sept. 13, 1966  A. M. SACKLER  3,271,880
MODEL OF LIFE FORM

Filed March 2, 1964  2 Sheets-Sheet 1

INVENTOR
ARTHUR M. SACKLER
BY Stanley Wolder
ATTORNEY

Sept. 13, 1966     A. M. SACKLER     3,271,880
MODEL OF LIFE FORM
Filed March 2, 1964                              2 Sheets-Sheet 2
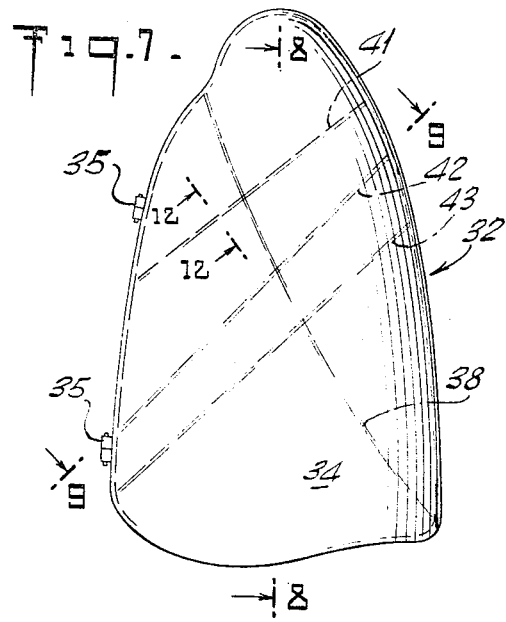
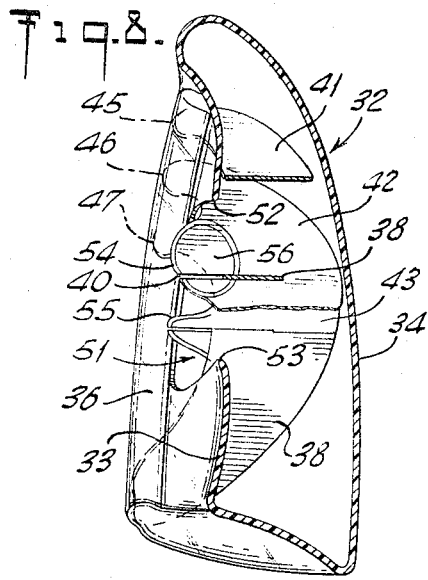
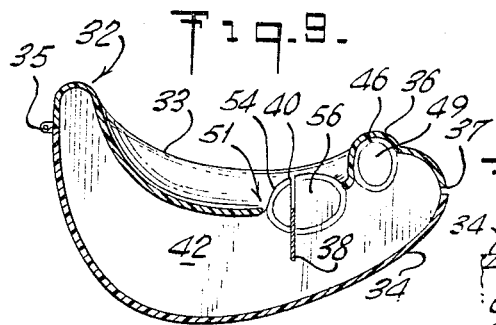
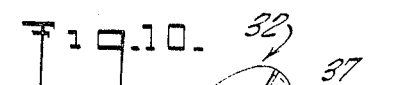
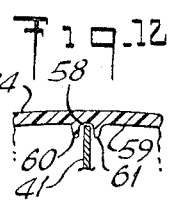
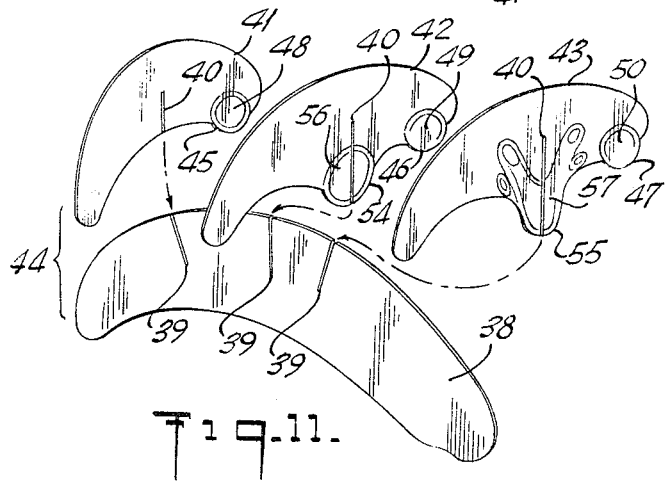
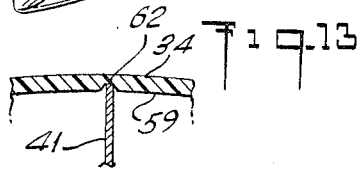
INVENTOR
ARTHUR M. SACKLER
BY Stanley Wolder
ATTORNEY

United States Patent Office 3,271,880
Patented Sept. 13, 1966

3,271,880
MODEL OF LIFE FORM
Arthur M. Sackler, 18 Searington Road,
Roslyn, Long Island, N.Y.
Filed Mar. 2, 1964, Ser. No. 348,575
11 Claims. (Cl. 35—17)

The present invention relates generally to anatomical models and more particularly to one which enables the portrayal in great detail of the gross and even the microscopic aspects of the life form involved.

An entire animal body or an organ thereof, or collections of organs thereof (here given the denomination "life form") have formed the basis for many types of anatomical models. The present invention represents an improvement upon the type of anatomical model disclosed in U.S. Patent No. 2,971,272, in which a body or other life form is formed with at least one portion thereof having a transparent wall, there being placed within the life form an information card or other type of insert which portrays portions or the entire organ in the normal or in the diseased or abnormal state. The limitation in connection with this anatomical form has resided principally in the amount of information which can be included in any one insert.

Thus, in the patent above mentioned, the wall of the life form contains a slot, and a planar insert may be inserted through the slot, in which case there is enabled a single view of the whole organ or of a longitudinal section thereof. In U.S. Patent No. 2,971,271, a form is provided in which the insert consists of two sheets which are disposed at an angle to one another and cross along their longitudinal axes, so that in effect there is shown a side view and a front view of the same human figure.

However, the structure of the body and organs of a body, is so diverse that it is frequently desirable to disclose more structure than a simple side view and front view will disclose. It is desirable to present other views thereof so that a student may appreciate the true complexity of an organ, or a physician, employing the same as a diagnostic aid, may at one glance secure a more comprehensive view of a normal or a diseased organ for comparison with the clinical picture before him.

It is a principal purpose of the present invention to provide a means of simultaneously disclosing a great many aspects of a life form in a manner which will be easily understood despite the complexity of the subject matter.

It is a further object thereof to provide anatomical devices which present at the same time both longitudinal and transverse sections of a life form.

It is still a further object of the present invention to provide an anatomical device which is capable of presenting at the same time both gross and sectional views, as well as microscopic views of tissues or other structures involved.

It is another important object thereof to provide the foregoing by means which may be simply and economically manufactured so as to enable the broad distribution thereof.

The above and other objects of the present invention are achieved in the preferred form by providing an anatomical model in the form of a hollow body shaped in accordance with the dimensions of a predetermined life form, the body having at least two walls which are pivotally connected and at least one wall which has a transparent portion, there being placed in the body a first insert in the form of a longer or longitudinal sheet containing anatomical information, and a second shorter sheet positioned transversely across the first insert, likewise containing anatomical information, the anatomical information being in the form of either the gross aspects, i.e. the view of the entire organism or organ as seen from the outside, or the sectioned views thereof, i.e. the appearance as presented if the organ were sectioned either longitudinally, as shown on the longer sheet, or transversely, as shown on the shorter sheet, or in the form of microscopic portrayals of portions of the life form. The anatomical information may be information which relates to the life form either in the normal state, or in the state of abnormality, or a special state such as pregnancy, menopause, old age, stress, etc.

Other objects and a fuller understanding of the present invention may be had by referring to the description and claims which follow, taken in conjunction with the accompanying drawings which illustrate preferred embodiments, it being understood that the foregoing statement of the objects of the subject invention and the brief summary thereof are intended generally to explain the same without limiting it in any manner.

FIG. 7 is a side elevational view of a lobe of a model lung embodying the present invention.

FIG. 8 is a sectional view thereof taken along the line 8—8 of FIG. 7 and showing the associated aorta portion.

FIG. 9 is a sectional view taken along line 9—9 of FIG. 7.

FIG. 10 is a front elevational view of said lobe.

FIG. 11 is an expanded view of the insert for said lobe, the transverse members thereof being shown displaced from their normal position.

FIG. 12 is a fragmentary sectional view taken along the line 12—12 of FIG. 7 showing a form of guide groove.

FIG. 13 is a similar view of another form of a guide groove.

Figure 4:
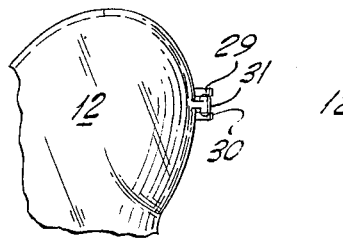
FIG. 4 is a fragmentary end view of a similar kidney containing an insert, but which discloses another type of hinge to pivotally connect the wall members of the model kidney.
Figure 5:
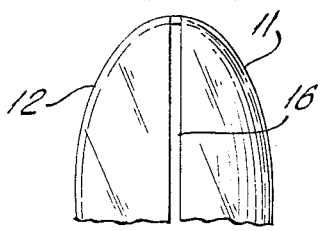
FIG. 5 is a fragmentary front view of the upper portion of the kidney of FIG. 2 as viewed from the direction indicated by arrow A in FIG. 2.

A preferred embodiment of the present invention is illustrated in FIGS. 1 through 5, which show a model kidney 10 formed of two generally longitudinally extending arcuate walls 11 and 12 which are pivotally connected by a pair of hinges 13, each hinge consisting of a pair of nubs 14, one extending rearwardly from each of walls 11 and 12 and one of the same lying immediately above the other and having aligned bores therethrough in which there is positioned a hinged pin 15. As best shown in FIG. 5 the front margins of walls 11 and 12 are slightly recessed from one another so as to provide a slot 16 extending substantially the length of model kidney 10. An aperture is formed in the rear side of the walls of the model kidney, substantially centrally located and having margins indicated by the numbers 17 and 18 in FIG. 2.

There may protrude from the rear of said model kidney by way of an integral extension from insert 19, a portion which illustrates the blood vessels 20a and the ureter 20b, the edges of the protruding portion being snugly in contact with the margins 17 and 18 of the aperture in the walls of the model kidney so as to firmly position and retain the insert within the model kidney. Insert 19 may be in the form of a longitudinal sheet 20.

Figure 1:
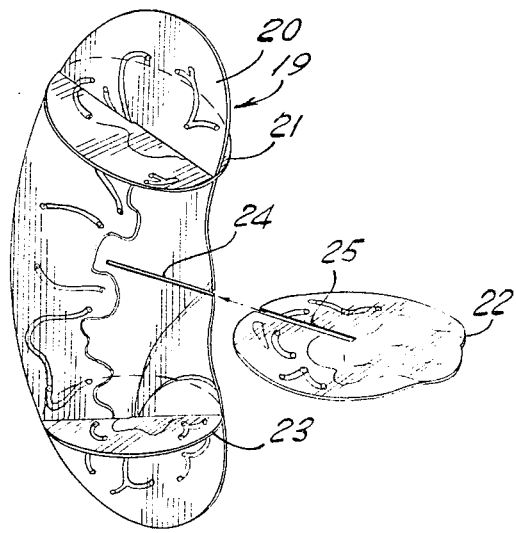
FIG. 1 is an expanded side elevational view of an insert embodying the present invention, one of the transverse members being shown extended laterally from its normal position on the insert.

There may be affixed to longitudinal sheet 20 shorter or transverse sheets 21, 22 and 23, the planes of each of said transverse sheets extending substantially normally to the plane of said longitudinal sheet, the lines of intersection being, in the cases of transverse sheets 21 and 23, substantially normal to the axis of the longitudinal sheet, but at an angle other than normal in the case of transverse sheet 22. As shown in FIG. 1 the transverse sheets may be removably affixed to longitudinal sheet 20 by means of corresponding slots 24 and 25 formed in the longitudinal sheet and the transverse sheets, respectively.

Longitudinal sheet 20 contains anatomical information of the type which would be observed if a kidney were sectioned longitudinally. Again there may be shown on one side of longitudinal sheet 20 a right parasagittal section, i.e. an eccentric longitudinal section running from front to rear and to the right of the midsagittal section. On the other side of sheet 20 there could be placed information relating to still another section or perhaps a view of the surface appearance of the organ.

In the insert of FIG. 1 there are illustrated three transverse sections. Obviously there may be any plurality of sections, and here too each side of a section could disclose information taken from a section displaced along the longitudinal axis from the other.

Insert 20 may be made of opaque cardboard or the like upon which the anatomical information has been lithographed. Again, it may be made of a transparent plastic upon which the information has been imprinted. The anatomical information appearing in the longitudinal and transverse sheets may be what is actually presented to an observer examining a section, or may be an abstraction therefrom, i.e. it may disclose only the nerves or blood vessels or the lymphatic system, etc.

Figure 6:
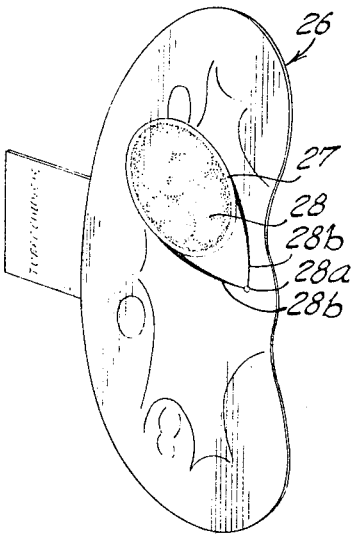
FIG. 6 is a perspective view of another insert suitable for use with the model kidney of FIG. 2.
Figure 2:
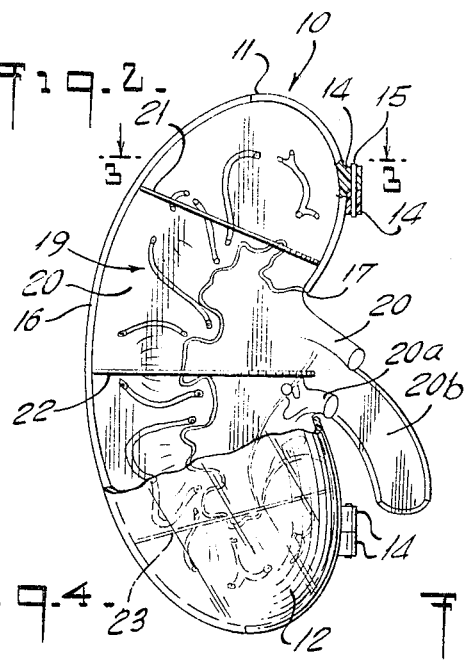
FIG. 2 is a side elevational view of a model of a kidney in which an insert somewhat more complex, by reason of the addition of a tab, has been placed, and which is viewed through the transparent walls thereof, portions thereof being broken away to show the underlying structure.
Figure 3:
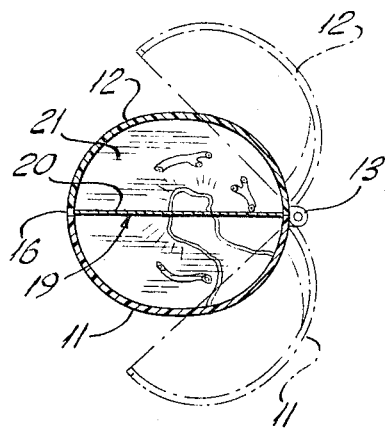
FIG. 3 is an end view of a model kidney, the wall members of the model of the kidney being shown pivoted apart but containing therebetween the insert of FIG. 1.

FIG. 6 discloses another type of insert 26, in which within an imprinted circle 27 there is contained a portrayal of a microscopic view 28 of the tissue which lies at an indicated point 28a, the point being indicated by lines 28b extending from circle 27. Insert 26 as shown is not provided with transverse members but may be used simply by inserting the same within slot 16 of model kidney 10.

In FIG. 4 there is shown another type of hinge member which may be employed to pivotally connect walls 11 and 12. In this form nubs 29 and 30 extend rearwardly from wall 12, while a T 31 extends rearwardly from wall 11, the ends of the T engaging nubs 29 and 30 within recessed portions of the same to provide the necessary hinge action. Of course, other types of hinges may be employed as well.

FIGS. 7 through 10 disclose another anatomical model form in the configuration of a model lobe 32 of a lung. As in the case of model kidney 10, model lobe 32 may be made of transparent polymeric material, and consists of two wall sections 33 and 34, connected at the rear by hinges 35, wall 33 having a semi-cylindrical protrusion formed therein to provide a model section of aorta 36. As in the case of model kidney 10, the confronting front edges of walls 33 and 34 are recessed to provide a slot 37 to enable the use of the model with an appropriate card of the type illustrated by FIG. 6.

Longitudinal sheet 38 contains slots 39 which match corresponding slots 40 in transverse sheets 41, 42 and 43 to provide an insert 44 when the walls of the respective matching slots are engaged. Each of said transverse sheets, 41, 42 and 43, which in this instance are substantially crescent in outline, contain lobes 45, 46 and 47, which lobes, when insert 40 is seated within lobe 32, are aligned within model aorta 36 and carry thereon sectional views respectively 48, 49 and 50. There is formed in wall 33 a substantially central triangular shaped aperture 51 having upper and lower margins 52 and 53, respectively, through which there protrudes extensions 54 and 55 of transverse sheets 42 and 43 respectively, said extensions snugly engaging the margins of aperture 51 so as to correctly position and rigidly retain in place the insert within the lung lobe 32. Extensions 54 and 55 and adjacent portions of transverse sheets 42 and 43 respectively bear representations 56 and 57 of the bronchial tree. Self-evidently, although not shown, other surfaces of insert 44 contain appropriate anatomical information.

FIGS. 12 and 13 illustrate two means of forming guide grooves in the walls 33 and 34 of lung lobe 32. Thus in FIG. 12 guide groove 58 is formed in wall 34 by means of molding into the inner surface 59 thereof parallel ridges 60 and 61 in which the periphery or margin of transverse sheet 43 is seated.

In FIG. 13 the guide groove 62 is formed merely by forming a groove in wall 34 in which the margin of transverse sheet 43 may likewise be seated. The seating of the marginal portions of insert 44, as exemplified by guide groove 58 or groove 62, serves the double purpose of accurately positioning the insert within model lobe 32 and at the same time tightly securing it and retaining it in place as the walls of the lobe are closed. Said guide slots therefore supplement the action of extensions 54 and 55 of transverse sheets 42 and 43 in rigidly maintaining the insert in place and accurately positioning it.

If the positioning of an insert in a given model organ or life form is made too difficult by incorporating guide slots in both walls, they may be incorporated in any one of the walls so that the inserts may be properly seated in the first instance and omitted in the second or covering wall.

There has been provided, therefore, a means of accurately portraying a vast amount of anatomical information on sheets inserted within model life forms having a transparent portion in at least one of the walls of the form. The information may be in the form of enlarged or normal sized or microscopic views of life forms, organs and tissue in normal, abnormal or special states, and is incorporated in means which are not only clearly viewable and available for comparison with clinical pictures presented to students and physicians and others using the same, but also in a means which is accurately positioned within the life form and which is securely maintained in place.

While there have been described and illustrated preferred embodiments of the present invention it is apparent that numerous alterations, omissions and additions may be made with departing from the spirit thereof.

What is claimed is:

1. An anatomical model comprising a hollow body in the shape of a life form, said body including at least two separable wall portions pivotally connected, at least a portion of one wall of said body being transparent, and an insert member dimensioned to fit within said wall portions in the closed position and visible through said transparent portion, said insert member including a first longitudinal sheet and a second transverse sheet intersecting said first sheet along a line extending transverse said first sheet, said sheets bearing anatomical features of said life form.

2. An anatomical model as described in claim 1, at least a portion of one of said walls having formed therein a grooved dimensioned and positioned to receive at least a portion of a margin of one of said sheets.

3. An anatomical model as described in claim 1, at least one of said walls having an aperture therethrough, a portion of at least one of said sheets extending through said aperture and bearing thereon a representation of an anatomical feature related to said life form.

4. An anatomical model as described in claim 1, a wall of said body having a first lobular portion, at least one of said sheets having a lobular portion positioned and dimensioned to fit within said first lobular portion.

5. An anatomical model comprising a hollow body in the shape of a life form, said body including at least two separable wall portions pivotally connected, at least a portion of one wall of said body being transparent, and an insert member dimensioned to fit within said wall portions in the closed position and visible through said transparent portion, said insert member including a first longitudinal sheet and a plurality of spaced transverse sheets each intersecting said first sheet along a line transverse said first sheet, said sheets bearing anatomical features of said life form.

6. An anatomical model as described in claim 5, at least a portion of one of said walls having formed therein a grooved dimensioned and positioned to receive at least a portion of a margin of one of said sheets.

7. An anatomical model as described in claim 5, at least one of said walls having an aperture therethrough, a portion of at least one of said sheets extending through said aperture and bearing thereon a representation of an anatomical feature related to said life form.

8. An anatomical model as described in claim 5, a wall of said body having a first lobular portion, at least one of said sheets having a lobular portion positioned and dimensioned to fit within said first lobular portion.

9. An anatomical model comprising a hollow body in the shape of a life form, said body including at least two separable wall portions pivotally connected, at least a portion of one of said walls of said body being transparent, and an insert member dimensioned to fit within said wall portions in the closed position and visible through said transparent portion, said insert member including a first longitudinal sheet and a plurality of spaced transverse sheets each intersecting said first sheet along a line transverse said first sheet, said body having protruding portions, said sheets having matching protrusions dimensioned and positioned to fit within said protruding portions, each sheet bearing anatomical features of said life form.

10. An anatomical model as described in claim 9, said sheets bearing said anatomical features on both sides thereof.

11. An anatomical model as described in claim 9, said anatomical information including a microscopic view of at least a portion of said anatomical information.

References Cited by the Examiner

UNITED STATES PATENTS

| | | | |
|---|---|---|---|
| 2,218,078 | 10/1940 | Assmuth et al. | 35—20 |
| 2,971,271 | 2/1961 | Goldenthal | 35—17 |
| 2,971,272 | 2/1961 | Barlow | 35—17 |

EUGENE R. CAPOZIO, *Primary Examiner.*